(12) United States Patent
Tagra et al.

(10) Patent No.: US 11,043,015 B2
(45) Date of Patent: Jun. 22, 2021

(54) GENERATING REFLECTIONS WITHIN IMAGES

(71) Applicant: Adobe Inc., San Jose, CA (US)

(72) Inventors: Sanjeev Tagra, Haryana (IN); Sachin Soni, New Delhi (IN); Ajay Jain, Ghaziabad (IN); Prasenjit Mondal, West Bengal (IN); Jingwan Lu, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/538,481

(22) Filed: Aug. 12, 2019

(65) Prior Publication Data

US 2021/0049799 A1 Feb. 18, 2021

(51) Int. Cl.
| | | |
|---|---|---|
| *G06T 11/60* | (2006.01) | |
| *G06T 5/00* | (2006.01) | |
| *G06T 7/11* | (2017.01) | |
| *G06T 7/60* | (2017.01) | |
| *G06T 3/40* | (2006.01) | |
| *G06T 7/90* | (2017.01) | |
| *G06T 11/00* | (2006.01) | |
| *G06T 3/20* | (2006.01) | |

(52) U.S. Cl.
CPC ............. *G06T 11/60* (2013.01); *G06T 3/20* (2013.01); *G06T 3/40* (2013.01); *G06T 5/002* (2013.01); *G06T 7/11* (2017.01); *G06T 7/60* (2013.01); *G06T 7/90* (2017.01); *G06T 11/001* (2013.01); *G06T 2207/20021* (2013.01); *G06T 2207/20221* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 2013/0222807 A1* | 8/2013 | Yen ................... | G01B 9/02015 |
| | | | 356/450 |
| 2014/0103935 A1* | 4/2014 | Pfaff .................. | G01R 15/241 |
| | | | 324/501 |
| 2017/0045748 A1* | 2/2017 | Sugiura .................. | G01C 1/02 |
| 2017/0134634 A1* | 5/2017 | Jin ........................ | H04N 5/2353 |
| 2018/0144446 A1* | 5/2018 | Morifuji ................ | G09G 5/026 |

(Continued)

OTHER PUBLICATIONS

Darlene Hildebrandt, "How to Create a Reflection in Photoshop in 6 Easy Steps," retrieved from https://digital-photography-school.com/how-to-create-a-reflection-in-photoshop-in-6-easy-steps/, published by Digital Photography School, retrieved and printed on Aug. 12, 2019.

(Continued)

*Primary Examiner* — Michelle Chin
(74) *Attorney, Agent, or Firm* — Kilpatrick Townsend & Stockton LLP

(57) ABSTRACT

Techniques for propagating a reflection of an object. In an example, a method includes receiving an input image comprising a first reflection of a first object on a reflective surface. The method further includes generating a second reflection for a second object in the input image. The second reflection is a reflection of the second object on the reflective surface. The method includes adding the second reflection to the input image. The method includes outputting a modified image comprising the first object, first reflection, the second object, and the second reflection.

20 Claims, 12 Drawing Sheets

(56) References Cited

U.S. PATENT DOCUMENTS

2018/0177392 A1* 6/2018 Xie .................. A61B 3/028
2019/0361392 A1* 11/2019 Trim ................. G02B 30/56

OTHER PUBLICATIONS

Photo Shop Essentials, "Water Reflection Effect in Photoshop CC and CS6" retrieved from: https://www.photoshopessentials.com/photo-effects/water-reflection-effect-in-photoshop-cs6/, published by photoshopessentials.com, retrieved and printed on Aug. 12, 2019.
Waseem Abbas, "How to Add Water Reflection Effect to Your Images in Photoshop" retrieved from: https://enviragallery.com/how-to-add-water-reflection-effect-to-your-images-in-photoshop/, published by Envira Gallery, retrieved and printed on Aug. 12, 2019.
Photoshop Cafe, "Create a Water Reflection in Photoshop" retrieved from: https://photoshopcafe.com/tutorials/water-reflection/water-reflection.htm, published by Photoshop Cafe, retrieved and printed on Aug. 12, 2019.
Entheosweb Blog, "Learn How to Create Water Reflection and Fog Effect in Photoshop" retrieved from: http://blog.entheosweb.com/tutorials/learn-how-to-create-water-reflection-and-fog-effect-in-photoshop, published by Entheosweb Blog, retrieved and printed on Aug. 12, 2019.
Design Crowd, "Water Reflections Using Displace Filter in Photoshop" retrieved from: https://blog.designcrowd.com/article/1016/water-reflections-using-displace-filter-photoshop-tutorial, published by DesignCrowd on Jun. 8, 2017, retrieved and printed on Aug. 12, 2019.
Photo Shop Desire, "How to Create Realistic Water Reflections with Ripples in photoshop" retrieved from: http://photoshopdesire.com/how-to-create-add-realistic-water-reflections-with-ripples-waves-in-photoshop-tutorial-psd/, published by Photoshop Desire on Apr. 8, 2016, retrieved and printed on Aug. 12, 2019.

* cited by examiner

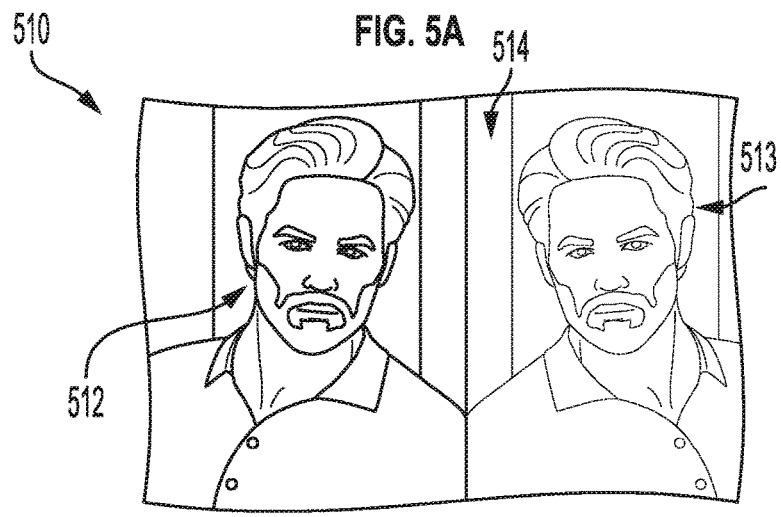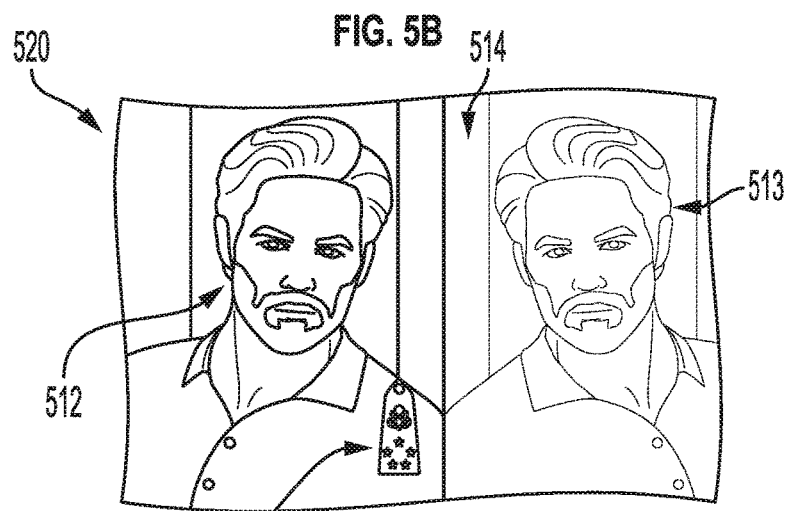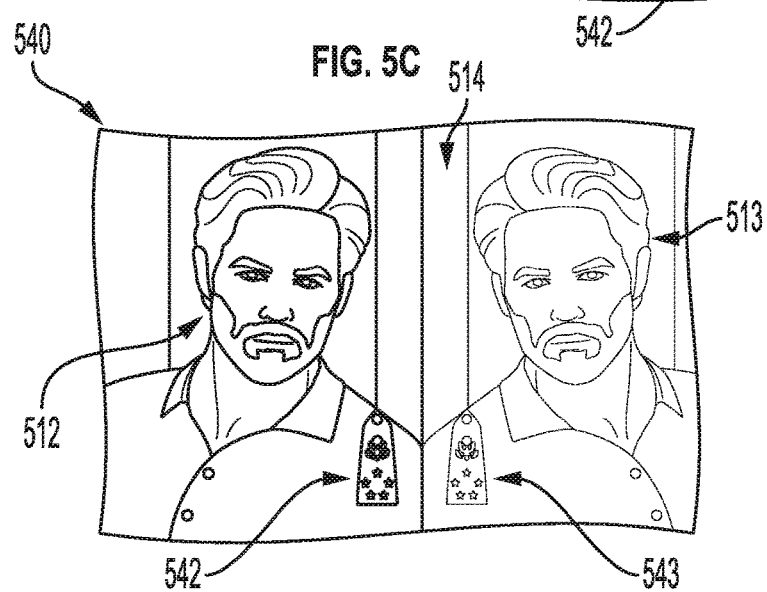
FIG. 5

GENERATING REFLECTIONS WITHIN IMAGES

TECHNICAL FIELD

This disclosure relates generally to reflections of objects in images. More specifically, but not by way of limitation, this disclosure relates to techniques for using an existing reflection of a first object in an image to automatically generate a reflection for a second object in the image.

BACKGROUND

Images or photographs quite often contain reflections of objects on reflective surfaces. Examples of these include a reflection of an object on water (or other liquid reflective surfaces), a reflection of an object on a glass or glass-like surface (e.g., reflection on a room window or a car window), and a reflection of an object on a shiny surface (e.g., reflection on a shiny top of a table). As part of editing an image with an existing reflection, a user may desire to add another object to the image and create a new reflection for that added object on the same reflective surface as the existing reflection.

For example, the original image may contain a house on the banks of a river with a reflection of the house on the surface of the river water. A user may want to add another object (e.g., a signpost or a mailbox next to the house) to the image and create a reflection for that added object on the river water surface. Currently, any new reflection has to be created manually by a user using existing image editing techniques. Due to the manual nature of the editing process, the task of creating a reflection, especially a realistic reflection, is not only tedious and time-consuming but also requires the user to possess substantial image processing skills. Creating realistic reflections in images is thus a very difficult task using existing tools and technologies.

SUMMARY

Techniques are disclosed herein for automatically generating a reflection of an object. In an example, a method receives an input image including a first reflection of a first object on a reflective surface. The method generates, from the first reflection, a second reflection for a second object in the input image. The second reflection is a reflection of the second object on the reflective surface. The method adds the second reflection generated to the input image. The method optionally outputs a modified image comprising the first object, first reflection, the second object, and the second reflection.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

FIGS. 3A, 3B, and 3C, depicts views of images that include objects and reflections, in accordance with an embodiment of the present disclosure.

FIGS. 4A, 4B, and 4C, depicts views of images that include objects and reflections, in accordance with an embodiment of the present disclosure.

FIG. 5, which includes FIGS. 5A, 5B, and 5C, depicts views of images that include objects and reflections, in accordance with an embodiment of the present disclosure.

DETAILED DESCRIPTION

Figure 1:
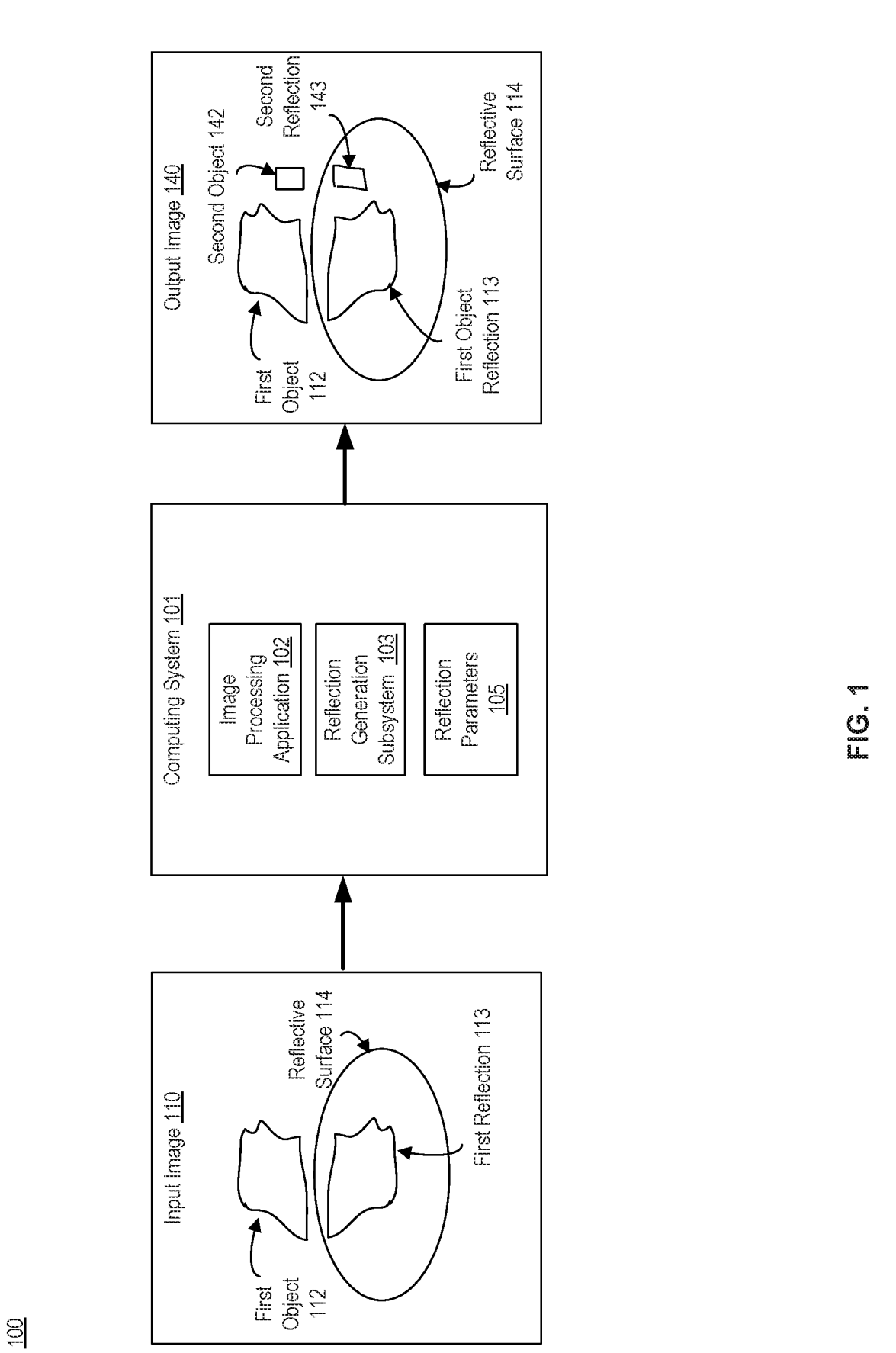
FIG. 1 is a diagram depicting an example of a computing environment for generating reflections of objects within images, in accordance with an embodiment of the present disclosure.

This disclosure describes techniques for using an existing reflection of a first object in an image to automatically generate a reflection for a second object in the image. In certain embodiments, the user identifies the object for which the reflection is to be generated and an image processing application (e.g., an image editor) automatically generates a reflection for the object using the first object and its existing reflection as references for the generation.

By automating the generation of reflections, the techniques described in this disclosure offer several improvements and benefits over existing techniques, which can require the user to manually generate such reflections. For example, using the techniques described herein, realistic and accurate reflections can be created in images very quickly. Because an existing object in the image and its corresponding reflection are used as references for generating the new reflection, the newly generated reflection is customized for the particular scene and reflecting surface depicted in the image, thereby improving the overall realism of the generated reflection.

The following non-limiting example is introduced for discussion purposes. An image processing application receives a digital image that includes a first object (e.g., a house) and a first reflection of that object on a reflective surface (e.g., a body of water). The image processing application receives a command from a user to place a second object (e.g., a sign) on the image and to generate a reflection of the second object on the reflective surface.

The image processing application invokes a reflection generation subsystem, which analyzes the first object and the first reflection to determine reflection parameters. The reflection parameters represent characteristics of the first reflection relative to the first object. For example, the reflection parameters can capture that parts of the first object appear stretched or shrunk in one or more dimensions when reflected. For example, a reflection of a house might have a bigger roof relative to the rest of the house when reflected as compared to in original form. Accordingly, reflection parameters can represent geometric changes of the first reflection relative to the first object.

In an example, reflection parameters include, for a given row of pixels of an object and for a corresponding row of pixels of a reflection, a measure of how a left-most point, a central point, or a right-most point have shifted when reflected. By capturing these shifts on row-by-row (or in some cases, an average of multiple rows), the reflection generation subsystem can obtain a representation of how the reflective surface alters a reflection. These parameters can be applied to a new object to adjust its size on a fine-grain basis. Therefore, when applied to a new object, the reflection generation subsystem can adjust the new object to look as if it were reflected on the same reflective surface.

In some cases, reflection parameters can also represent color. In an example, the color of the reflection may be altered relative to the object given the light and the nature of a reflective body (e.g., water or glass). These color parameters can be separately computed for colors in a given color system, e.g., red, green, and blue.

The reflection generation subsystem applies the reflection parameters and the color parameters to the first object, thereby creating the reflection. The image processing application can also place the reflection on the image, thereby creating a final image. Continuing the example, the final image therefore shows a house and a corresponding reflection on the body of water and a sign next to the body of water with a corresponding reflection on the body of water.

Certain Definitions

As used herein, "reflection parameters" represent one or more characteristics of an existing object and its corresponding reflection. For example, reflection parameters can represent geometric properties of the reflection relative to the object, e.g., the shape of an object and the altered shape of its reflection. Reflection parameters can also represent the color of the reflection relative to the object.

As used herein, a "bounding box" is a rectangular box that encloses a detected or otherwise identified object in a digital image, a reflection of the object, or both.

As used herein, a "center line" is a midpoint of a side of a bounding box. In some cases, the center line is vertical, creating left and right sections. In other cases, the center line is horizontal, creating top and bottom sections.

As used herein, a "row" is a strip of pixels along a particular dimension (e.g., horizontal or vertical), for example, within a bounding box. A row is one or more pixels wide.

As used herein, a "left boundary" refers to the left-most point that corresponds to either an object or a reflection within a given row. A "left boundary pixel" is a pixel that corresponds to the left boundary for a particular row. White space to the left of the object or reflection can be ignored.

As used herein, a "right boundary" refers to the right-most point that corresponds to either an object or a reflection within a given row. A "right boundary pixel" is a pixel that corresponds to the right boundary for a particular row. White space to the right of the object or reflection can be ignored.

As used herein, a "center axis" for a given row is a point that is equidistant between the left boundary and the right boundary. Compared to the center line, which is constant throughout a bounding box, a center axis can vary by row, based on the content of the boundary box (e.g., an image or its reflection). A "center axis pixel" is a pixel that corresponds to the center axis for a particular row. A central axis is not necessarily aligned with a particular coordinate system. However, the block-by-block approach described herein can capture a non-linear axis or an abnormal shape of an object or reflection.

As used herein, a "block" is a group of one or more rows. Reflection parameters can be calculated on a block-basis, for example, by averaging a parameter calculated for each row over the number of rows in a block. For example, a given reflection parameter may be calculated as a distance between a center axis pixel and the center line for a particular row. The reflection parameter can then be calculated for several rows and averaged on a block-basis.

Turning now to the Figures, FIG. 1 is a diagram depicting an example of a computing environment for generating reflections of objects within images, in accordance with an embodiment of the present disclosure. FIG. 1 depicts computing environment 100, which includes one or more of input image 110, output image 140, and computing system 101. As discussed further herein, in an example, computing environment 100 accesses input image 110, analyzes one or more objects and their corresponding reflections present within input image 110 to create reflection parameters. Then, computing environment 100 can use the reflection parameters to create one or more reflections of objects that did not previously have reflections within the image and optionally generates output image 140 with the generated reflections.

Input image 110 includes one or more of first object 112, first reflection 113, and reflective surface 114. First object 112 can be any object, such as a shape or text. Examples of a first object include houses, buildings, trees, and the like. First reflection 113 is a reflection of first object 112 on reflective surface 114. Examples of reflective surface 114 include water or glass. Output image 140, generated and/or updated by computing system 101, includes one or more of first object 112, first reflection 113, reflective surface 114, second object 142, and second reflection 143.

Computing system 101 includes image processing application 102, reflection generation subsystem 103, and reflection parameters 105. Various functionality described herein can be implemented by image processing application 102, reflection generation subsystem 103, or both. In an example, image processing application 102 implements image editing functionality such as selection of image objects, while reflection generation subsystem 103 implements functionality related to reflections. Reflection parameters 105 include one or more parameters that represent how first object 112 is reflected on reflective surface 114 to create first reflection 113.

Reflection parameters 105 represent one or more characteristics of first reflection 113 relative to first object 112, including geometry or color. Reflection parameters 105 therefore represent geometric and/or color changes of first reflection 113 relative to first object 112.

In an example, a user selects input image 110 using image processing application 102. Input image 110 includes first object 112 and reflective surface 114. Reflective surface may be water, glass or glass-like surface, a shiny surface, or any surface that is capable of showing a reflection. The user then, using image processing application 102, adds or places second object 142 to input image 110. The user indicates to image processing application 102 that a reflection for the second object should be generated in the image.

In response, reflection generation subsystem 103 analyzes first object 112 and first reflection 113 to create one or more reflection parameters 105. Reflection generation subsystem 103 then applies reflection parameters 105 to second object 142, thereby creating second reflection 143. Second reflection 143 is consistent in appearance and color attributes with first reflection 113. For example, color attributes can model ripples in water or the shading caused by light. present in the first reflection are accurately and appropriately represented in the second newly added reflection. In this manner, the style of the first reflection is maintained and a realistic reflection is automatically added to input image.

Figure 2:
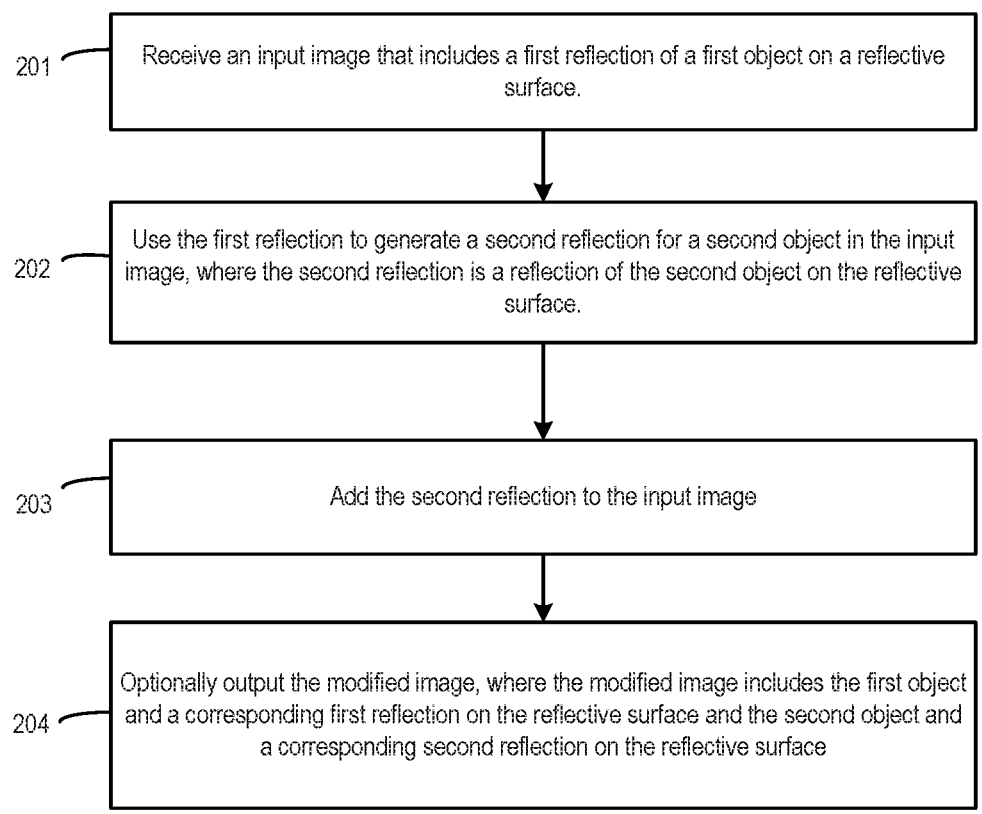
FIG. 2 is a flow chart depicting an example of a process for generating reflections of objects within images, in accordance with an embodiment of the present disclosure.

FIG. 2 is a flow chart depicting an example of a process 200 for generating reflections of objects within images, in accordance with an embodiment of the present disclosure. For illustrative purposes, process 200 is implemented by reflection generation subsystem 103. But any computing device or application, e.g., image processing application 102, can implement process 200.

At block 201, process 200 involves receiving an input image that includes a first reflection of a first object on a reflective surface. For illustrative purposes, process 200 is discussed with respect to FIG. 3, which depicts examples of various images.

Figure 3:
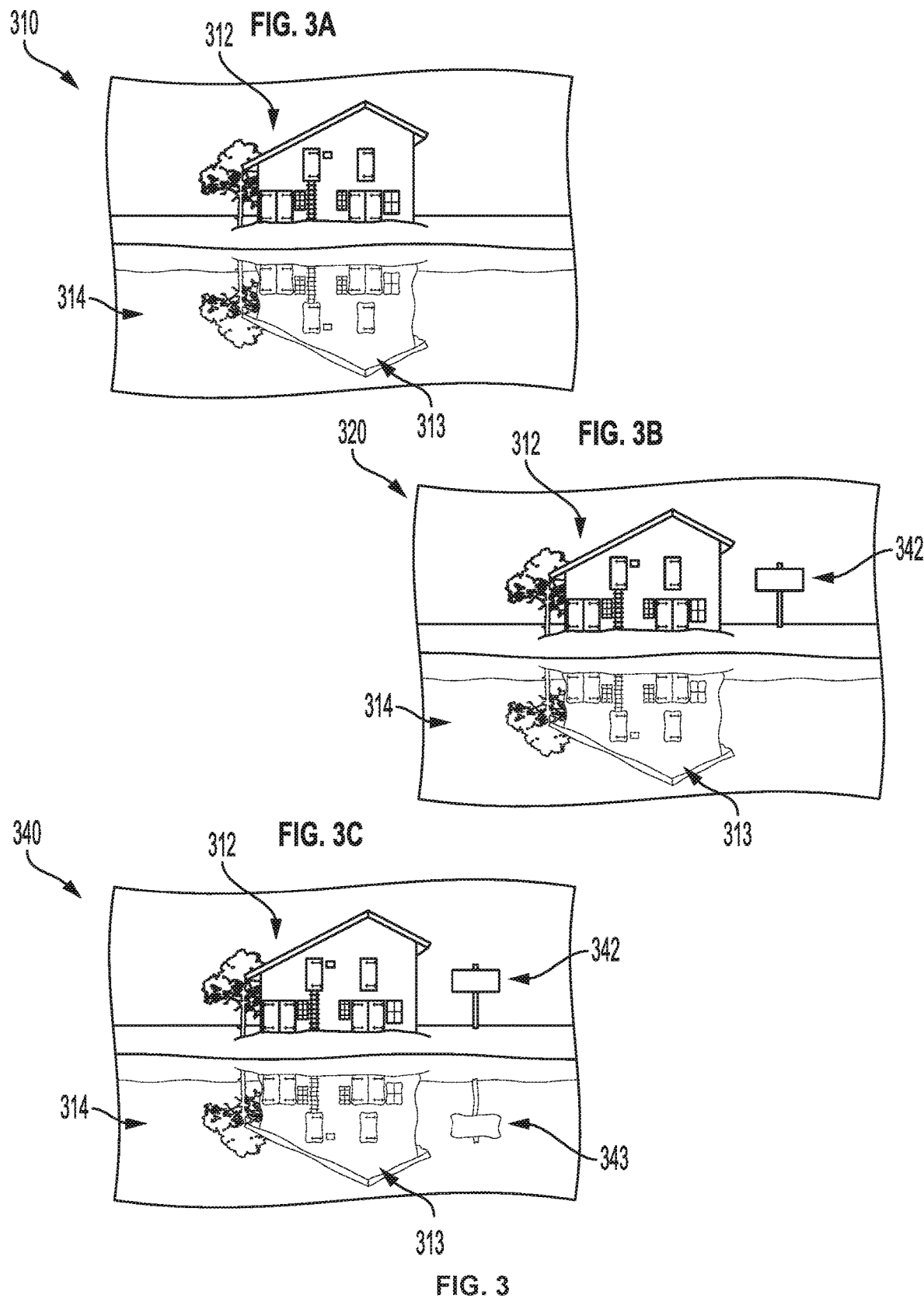
FIG. 3, which includes

FIG. 3, which includes FIGS. 3A, 3B, and 3C, depicts views of images that include objects and reflections, in accordance with an embodiment of the present disclosure. FIG. 3A depicts an example of an input image 310. Input image 310 includes first object 312, which is a house, reflective surface 314, which is a body of water, and first reflection 313, which is an existing reflection of first object 312. First reflection 313 can be created by any image processing application such as image processing application 102. Continuing the example, reflection generation subsystem 103 accesses input image 310.

Returning to FIG. 2, at block 202, process 200 involves using the first reflection to generate a second reflection for a second object in the input image. Referring again to FIG. 3, FIG. 3B depicts image input 320, which includes first object 312, reflective surface 314, and first reflection 313. Image 320 also includes second object 342, a sign, which was placed by a user, for example, by using image processing application 102. As can be seen, image 320 is visually incomplete because the sign, which is near the lake, should have its own reflection on the surface of the lake.

Different methods can be used to create reflection parameters. Examples of processes that can generate and/or use a reflection parameters include FIG. 6, FIG. 8, and FIG. 9. In a simplified example, reflection generation subsystem 103 analyzes first object 312 and first reflection 313 to generate reflection parameters that represent a relative size (e.g., stretching or shrinking) and the first reflection 313 with respect to first object 312.

At block 203, process 200 involves adding the second reflection to the input image. Turning again to FIG. 3, FIG. 3C depicts output image 340, which includes first object 312, first reflection 313, second object 342, and reflective surface 314. Relative to image 320, output image 340 also includes second reflection 343, which is consistent in appearance with both second object 342 and with an expected reflection on reflective surface 314. As can be seen, the reflection generation subsystem 103 has applied the reflection parameters generated at block 203 to second object 342 to create second reflection 314, which is a realistic reflection of the second object on reflective surface 314.

Returning to FIG. 2, at block 204, process 200 optionally involves outputting the modified image. The modified image includes the first object and a corresponding first reflection on the reflective surface and the second object and a corresponding second reflection on the reflective surface. Continuing the example, reflection generation subsystem 103 outputs output image 340.

Figure 4:
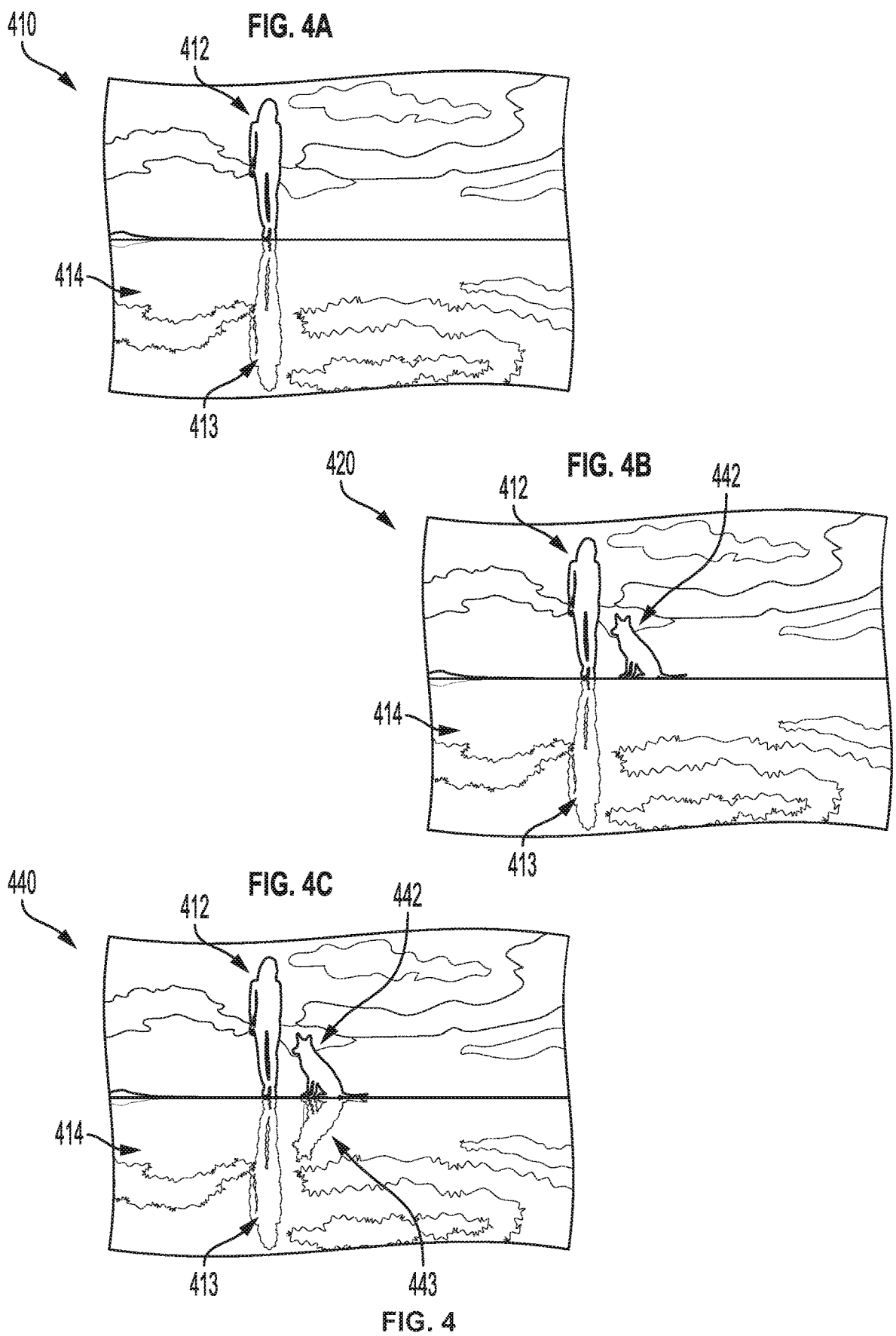
FIG. 4, which includes

FIG. 4, which includes FIGS. 4A, 4B, and 4C, depicts views of images that include objects and reflections, in accordance with an embodiment of the present disclosure. FIG. 4A depicts input image 410, which includes first object 412 (a silhouette of a person on a beach), reflective surface 414 (a thin layer of water on the beach), and first reflection 413, which is a reflection of first object 412. FIG. 4B depicts image 420, which includes first object 412, reflective surface 414, and first reflection 413. Input image 420 also includes second object 442, a dog.

FIG. 4C depicts output image 440. Reflection generation subsystem 103 can generate output image 440. Output image 440 includes first object 412, first reflection 413, reflective surface 414, and second reflection 443. As can be seen, second reflection 443 is consistent with both second object 442 and with a reflection of first object 412 on reflective surface 414. Second reflection 443 is a reflection of the dog.

FIG. 5, which includes FIGS. 5A, 5B, and 5C, depicts views of images that include objects and reflections, in accordance with an embodiment of the present disclosure. FIG. 5A depicts input image 510, which includes first object 512 (a man's face), reflective surface 514 (a window), and first reflection 513, which is a reflection of first object 512 on a surface of the window. FIG. 5B depicts image 520, which includes first object 512, reflective surface 514, and first reflection 515. Input image 520 also includes second object 542, which is a patch on the man's shirt.

FIG. 5C depicts output image 540. Output image 540 includes first object 512, first reflection 515, reflective surface 514, and second reflection 543. As can be seen, second reflection 543 is consistent with both second object 552 and with a reflection of first object 512 in reflective surface 514. Second reflection 543 depicts a reflection of the patch in the glass. Reflection generation subsystem 103 can generate output image 540.

Figure 6:
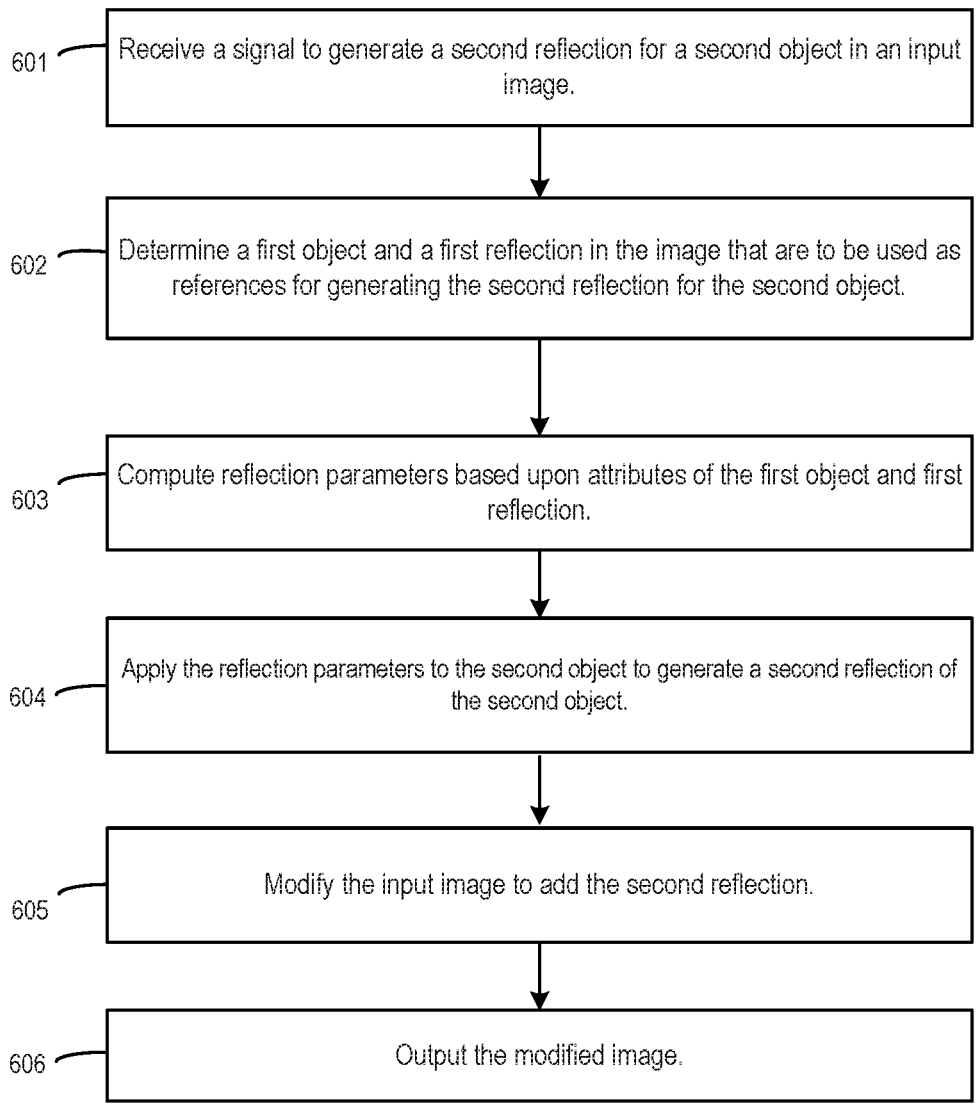
FIG. 6 is a flow chart depicting an example of a process for generating reflections of objects within images, in accordance with an embodiment of the present disclosure.

FIG. 6 is a flow chart depicting an example of a process 600 for generating reflections of objects within images, in accordance with an embodiment of the present disclosure. For illustrative purposes, process 600 is implemented by reflection generation subsystem 103. But any computing device or application, e.g., image processing application 102, can implement process 600.

Different lines of symmetry are possible. For example, in the case that the reflection is left-to-right, e.g., the line of symmetry is vertical, image processing application 102 can rotate the image such that the line of symmetry is horizontal, with the image above the reflection. Image processing application 102 can operate on an image that has a line of symmetry that is any angle. In this case, image processing application 102 can rotate the image such that the line of symmetry corresponds to the approach described herein. In other cases, rotation can be avoided by adjusting the various parameters described herein to operate on a different axis.

At block 601, process 600 involves receiving a signal to generate a new reflection for a second object in an input image. Examples of signals include user-driven commands and external signals. For example, a user invoke a command or a user interface element in image processing application 102, which in turn causes a new reflection to be generated. The command could be invoked when a new object is added to the image when the user selects an object within the image (e.g., a newly added or existing object), when the user requests automated generation of a reflection (e.g. by selecting a user-selectable option in a graphical user interface), or when the user identifies a second object to be placed in the image and a position where the second object is to be placed. In response, image processing application 102 continues to execute block 602.

At block 602, process 600 involves determining a first object and a first reflection in the image that are to be used as references for generating a second reflection for the second object. A user can specify the first object and the corresponding first reflection by using a user interface or a command. In some cases, image processing application 102 can automatically detect all objects in the input image and present the user with a set of options. In other cases, the image processing application 102 can identify the first object in the image and its corresponding reflection based on the position of the newly added or selected second object.

In some cases, if objects within the image are not already identified, for example, in the case that the image is an imported non-vector image, then image processing application 102 can segment the image to identify the objects. Segmentation refers to a process of assigning a label to every pixel in an image such that pixels with the same label share certain visual characteristic (e.g., part of an instance of an object or not). Any suitable segmentation technique can be used.

An example of a segmentation process is as follows:
1. Apply filtering (e.g., via a median filter) to remove noise from the image.
2. Create a black-and-white image from the filtered image.
3. Apply a convolutional neural network to the image. In an example the neural network architecture includes multiple convolutional layers and outputs a final segmentation map. In some cases, the computational burden can be decreased by periodically down-sampling the feature maps by using pooling or by using strided convolutions (e.g. by compressing the spatial resolution) without concern. In another example, image segmentation can be accomplished via an encoder-decoder structure. In such a structure, a spatial resolution of the input is down-sampled, thereby developing lower resolution feature mappings which are learned to be highly efficient at discriminating between classes. The feature representations can be up-sampled into a full-resolution segmentation map.

Binarization can also be used after segmentation. Binarization is a process of transforming a pixel image into a binary image. A binary image includes pixels that have one of two values: black or white. Binarization involves applying a threshold to each pixel. If a value of a pixel is greater than the threshold, the pixel is marked as black. Otherwise, the pixel is marked as white. A binarized image can be post-processed by removing small components from the image and then filling in holes (regions of white pixels that are entirely surrounded by black pixels).

Figure 7:
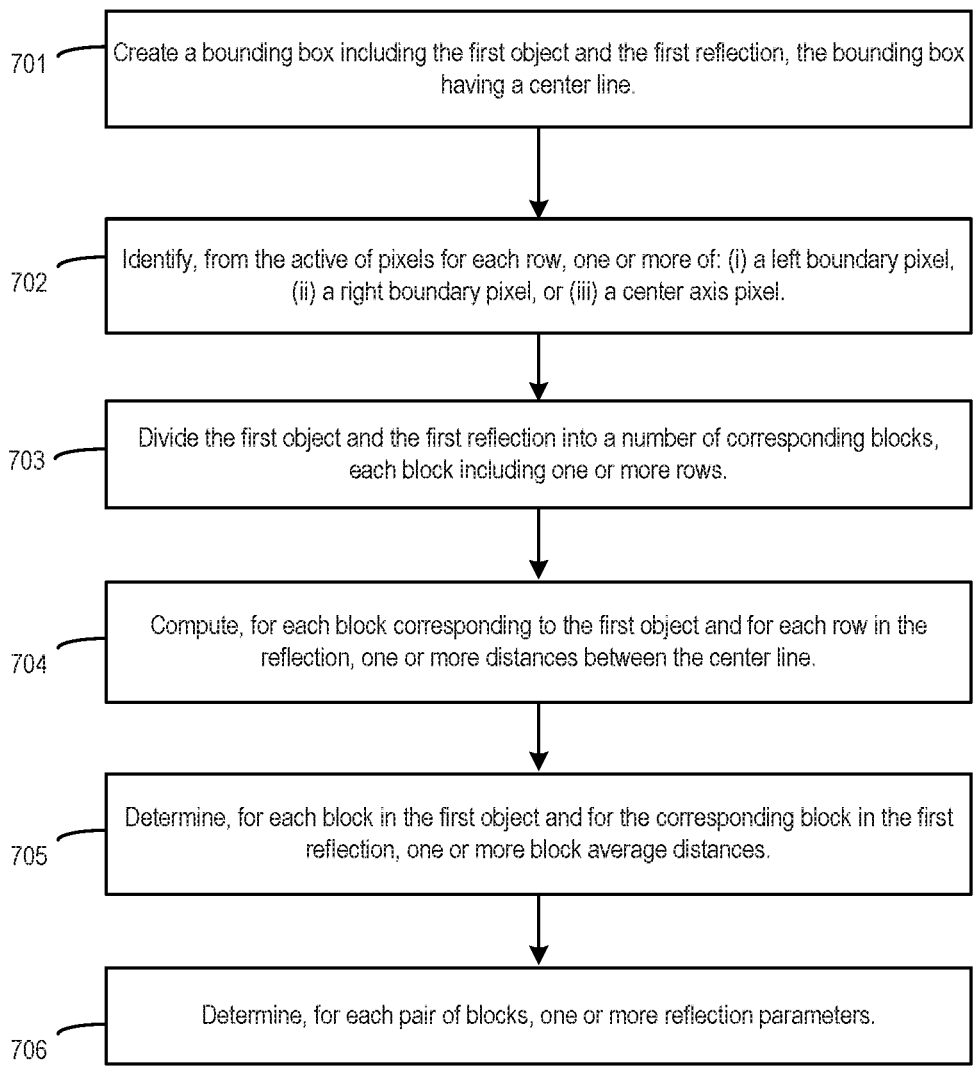
FIG. 7 is a flow chart depicting an example of a process for computing reflection parameters of an existing object and reflection within an image, in accordance with an embodiment of the present disclosure.

At block 603, process 600 involves computing reflection parameters based upon attributes of the first object and first reflection. An example of a process that implements block 603 is shown in FIG. 7. Reflection parameters represent the shape, size, or color of the first reflection relative to the first object, thereby capturing properties of the reflective surface.

Figure 9:
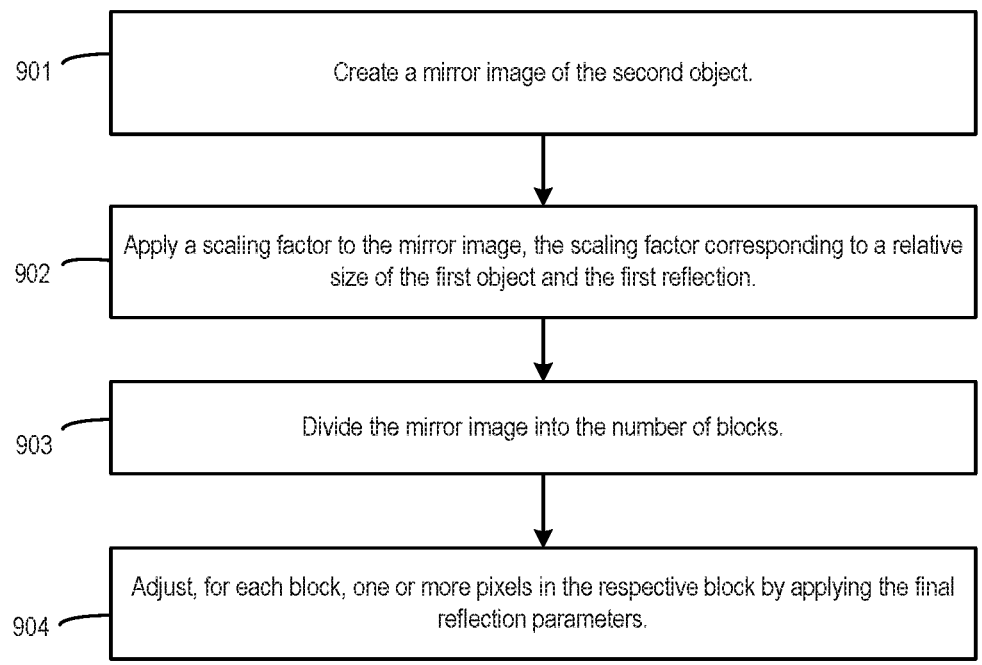
FIG. 9 is a flow chart depicting an example of a process for applying reflection parameters to create a new reflection, in accordance with an embodiment of the present disclosure.

At block 604, process 600 involves applying reflection parameters to the second object to generate a second reflection for the second object. By applying the reflection parameters, the reflection generation subsystem 103 creates a second reflection that matches the second object, but also is consistent with the nature of the reflective surface. An example of a process that implements block 604 is shown in FIG. 9.

At block 605, process 600 involves modifying the input image to add the second reflection. In some cases, the image processing application 102 and/or the reflection generation subsystem 103 can modify the input image 110 and add the second reflection 143. In other cases, the input image is left unmodified and a new output image 140 is created.

At block 606, process 600 involves outputting the modified image. Image processing application 102 can output the modified image (or new output image) to a display, printer, or other device, or transmit the modified image across a network to another device or system.

FIG. 7 is a flow chart depicting an example of a process 700 for computing reflection parameters of an existing object and reflection within an image, in accordance with an embodiment of the present disclosure. For illustrative purposes, process 700 is implemented by reflection generation subsystem 103. But any computing device or application, e.g., image processing application 102, can implement process 700.

At block 701, process 700 involves creating a bounding box including the first object and the first reflection. A bounding box can also have a center line, which is the horizontal midpoint of the bounding box. The bounding box can be a minimal bounding box, e.g., the smallest bounding box that will accommodate both the first object and the first reflection. In some cases, the bounding box can be divided into multiple rows. Each row has a set of pixels (e.g., left-to-right).

Reflection generation subsystem 103 determines the boundary of the first object and of the first reflection. As described with respect to block 602 of process 600, segmentation and/or binarization of the input image can be used. An example of a method is connected component analysis (CCA). CCA operates by performing a sequence of operations for each connected component. CCA considers a pixel as a boundary pixel if the pixel is a black pixel and if any of one eight neighbor pixels of the pixel is a white pixel. The center axis pixel of the first object and the center axis pixel of the first reflection are independently computed.

At block 702, process 700 involves identifying, from active pixels for each row, one or more of: (i) a left boundary pixel, (ii) a right boundary pixel, or (iii) a center axis pixel. Active pixels are pixels in a given row that correspond to either the first object or the first reflection. Inactive pixels are pixels that are outside the boundaries of the first object and the first reflection. For example, reflection generation subsystem 103 determines, for a given row, by examining white space, a left boundary pixel that is the left-most pixel that corresponds to an object or a reflection and a left boundary pixel that is the left-most pixel that corresponds to an object or a reflection. For a given row, reflection generation subsystem 103 can determine the center axis pixel by determining a midpoint between the left boundary pixel and the right boundary pixel. For illustrative purposes, process 700 is discussed with respect to FIG. 8.

Figure 8:
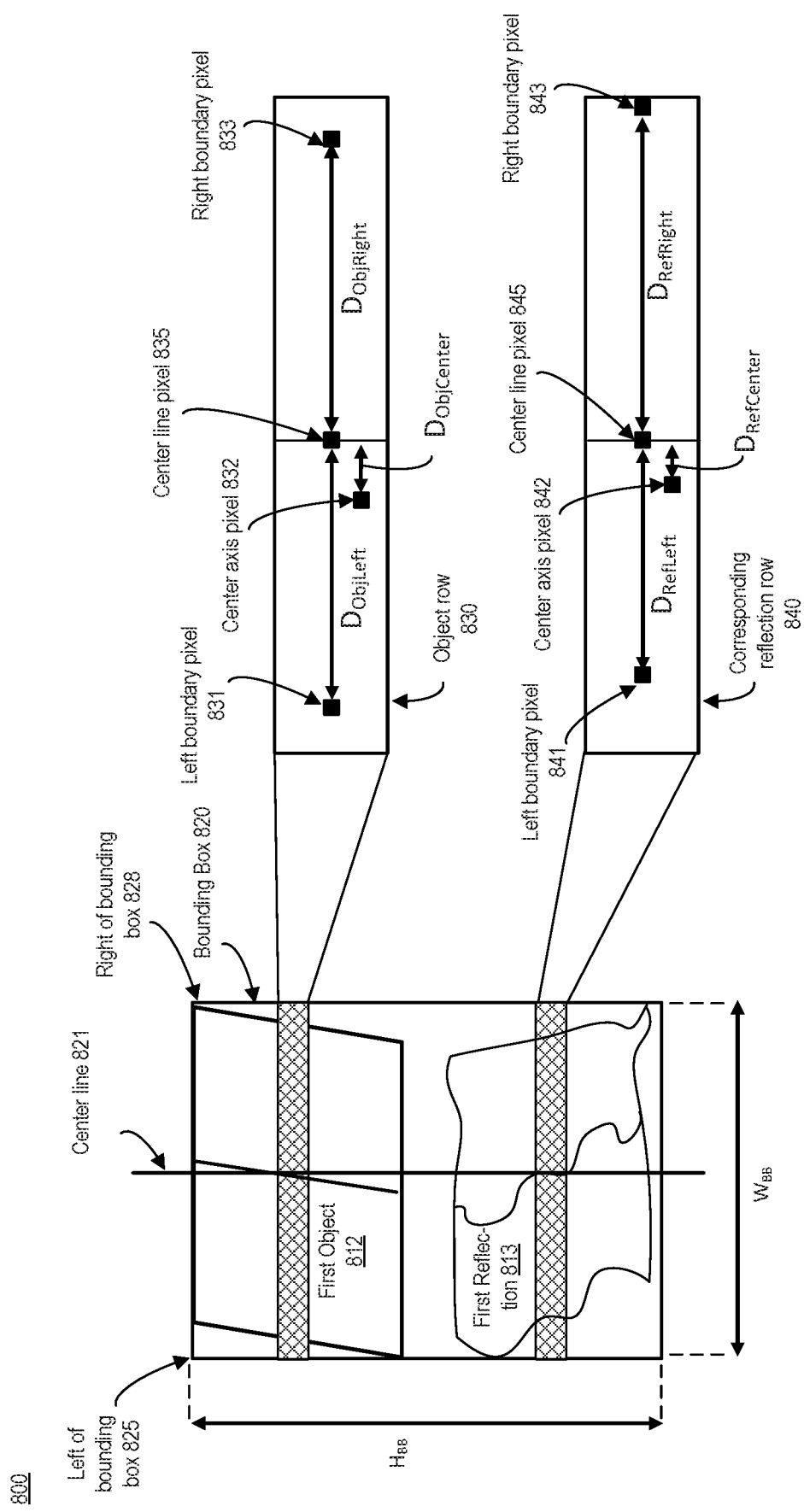
FIG. 8 is a diagram depicting an example of a center axis and a center line of a boundary box that includes an object and its reflection, in accordance with an embodiment of the present disclosure.

FIG. 8 is a diagram depicting an example of a center axis and a center line of a boundary box that includes an object and its reflection, in accordance with an embodiment of the present disclosure. FIG. 8 includes bounding box 820, object row 830, and reflection row 840.

Bounding box 820 includes first object 812, first reflection 813, left of bounding box 825, right of bounding box 828, and center line 821. As discussed, bounding box 820 is sized to fit around the combination of the first object 812 and the first reflection 813. Left of bounding box 825 represents the left side of the bounding box as oriented. Right of bounding box 828 represents the right side as oriented. Center line 821 represents the midpoint of the boundary box. Reflection generation subsystem 103 determines center line 821. The boundary box has dimensions height, $H_{BB}$, and width, $W_{BB}$.

As discussed, reflection generation subsystem 103 can divide the bounding box, and therefore, the first object and the first reflection, into rows. Each row that corresponds to a first object also corresponds to a row in the first reflection and vice versa. An example of two corresponding rows is depicted, each with one pixel height. As depicted, object row 830 and corresponding reflection row 840 represent corresponding portions of the first object 812 and the first reflection 813 respectively.

Object row 830 represents a row of first object 812. In particular, object row 830 includes left boundary pixel 831, center axis pixel 832, center line pixel 835, and right boundary pixel 833. In the example shown, a row has a height of one pixel.

Left boundary pixel 831 represents the left-most active pixel in the row, that is the left-most pixel that corresponds to the object. There may be pixels to the left of the left boundary pixel 831 that are white, or zero. Right boundary pixel 833 represents the right-most active pixel in the row, that is the right-most pixel that corresponds to the object. There may be pixels to the right of the right boundary pixel 833 that are white, or zero. Object row 830 includes center axis pixel 832, which represents the pixel that is mid-point between the left boundary pixel 831 and the right boundary pixel 833. Center line pixel 835 is the pixel that is located on the center line 821.

Similarly, reflection row 840, which corresponds to object row 830, represents a row of first reflection 813. In particular, object row 830 includes left boundary pixel 841, center axis pixel 842, center line pixel 845, and right boundary pixel 843. Left boundary pixel 841 represents the left-most active pixel in the row. Right boundary pixel 843 represents the right-most active pixel in the row. Reflection row 840 includes center axis pixel 842, which represents the pixel that is mid-point between the left boundary pixel 841 and the right boundary pixel 843. Center line pixel 845 is the pixel that is located on the center line 821.

At block 703, process 700 involves dividing the first object and the first reflection into a number of corresponding blocks. A block can include one or more rows. The parameters can be determined on a block-basis, that is, an average for a given block. For example, in the case that blocks are used, reflection generation subsystem 103 can determine a distance between the center line and the left boundary for each row in the block, then averages the distances for all the rows in the block. Similarly, reflection generation subsystem 103 can determine a distance between the center line and the right boundary for each row in the block, then averages the distances for all the rows in the block.

The quality of the output image and/or the reflection propagation can depend on the number of blocks used. For example, if a greater number of blocks per given object are used, then the quality is higher than if a lower number of blocks is used. In some cases, the number of blocks used can be provided by the user or derived from a parameter provided by the user. For example, a user can select a resolution parameter from a sliding scale from fine-grain to coarse, where a fine-grain setting causes a higher number of blocks to be used relative to the coarse setting. In other cases, the number of blocks is predetermined.

At block 704, process 700 involves computing, for each row in each block corresponding to the first object and for each row in each block corresponding to the first reflection, one or more distances. The first object and the first reflection can include corresponding blocks. For example, a block in the first object can include an object (e.g., part of a roof of a house) that corresponds to a block in the first reflection (e.g., the reflected part of the roof). Examples of distances include one or more of: (i) a center distance between the center axis pixel of the respective row and the center line of the respective row, (ii) a left distance between the left boundary of the respective row and the center line of the respective row, and (iii) a right distance between the right boundary of the respective row and the center line of the respective row. In applications with different lines of symmetry, these left, center, and right distances can be reconfigured accordingly, for example as bottom, center, and top distances respectively.

More specifically, reflection generation subsystem 103 can calculate, for the first object:

$D_{ObjCenter}$=Euclidean distance between the center line and the center axis pixel for a given row of the first object;

$D_{ObjLeft}$ Euclidean distance between the center line and the left boundary pixel for a given row of the first object; and $D_{ObjRight}$=Euclidean distance between the center line and the right boundary pixel for a given row of the first object. Reflection generation subsystem 103 can also calculate, for the first reflection:

$D_{RefCenter}$=Euclidean distance between the center line and the center axis pixel for a given row of the first reflection;

$D_{RefLeft}$=Euclidean distance between the center line and the left boundary pixel for a given row of the first reflection; and $D_{RefRight}$=Euclidean distance between the center line and the right boundary pixel for a given row of the first reflection.

In some cases, the left or right boundary pixels may be on an opposite side of the center line, due to the shape of the object. For example, a shape may be all on the right of the center line, resulting in both the left and right boundary pixels being on the right side of the center line. With the Euclidean distances computed, reflection generation subsystem 103 can determine reflection parameters.

As illustrated by FIG. 8, a given row of an object includes a left boundary pixel 831, a right boundary pixel 833, and a center axis pixel 832. A given row of a reflection includes a left boundary pixel 841, a right boundary pixel 843, and a center axis pixel 842.

Returning to FIG. 7, at block 705, process 700 involves determining, for each block in the first object and for the corresponding block in the first reflection, one or more block average distances. Block average distances are averages for all the rows in a particular block. For each block in the object and corresponding block in the reflection, distances measured between the center line and the respective left boundary pixel, the respective center axis pixel, and the respective right boundary pixel, reflection generation subsystem 103 can represent the appearance of the first reflection 813 relative to the first object 812.

For example, for a given block in the object, the average center distance is computed as:

$$D_{ObjAvgCenter} = \frac{\sum_{i=1}^{n} D_{ObjCenter}}{n},$$

where there are n rows in the block and i iterates over the rows.

For a given block in the first object, the average left distance is computed as:

$$D_{ObjAvgLeft} = \frac{\sum_{i=1}^{n} D_{ObjLeft}}{n},$$

where there are n rows in the block and i iterates over the rows.

For a given block in the first object, the average right distance is computed as:

$$D_{ObjAvgRight} = \frac{\sum_{i=1}^{n} D_{ObjRight}}{n},$$

where there are n rows in the block and i iterates over the rows.

Similarly, for a given block in the first reflection, the average center distance is computed as:

$$D_{RefAvgCenter} = \frac{\sum_{i=1}^{n} D_{RefCenter}}{n},$$

where there are n rows in the block and i iterates over the rows.

For a given block in the first reflection, the average left distance is computed as:

$$D_{RefAvgLeft} = \frac{\sum_{i=1}^{n} D_{RefLeft}}{n},$$

where there are n rows in the block and i iterates over the rows.

For a given block in the first reflection, the average right distance is computed as:

$$D_{RefAvgRight} = \frac{\sum_{i=1}^{n} D_{RefRight}}{n},$$

where there are n rows in the block and i iterates over the rows.

At block 706, process 700 involves determining reflection parameters. A pair of blocks includes a block from the first object and a corresponding block from the first reflection. Reflection parameters include the average center, left, and right distances, which can be represented:

$D_{AdjustAvgCenter} = D_{RefAvgCenter} - D_{ObjAvgCenter}$, e.g., an average center distance for all of the rows in a block of the reflection minus the average center distance for all of the rows in the corresponding block of the object;

$D_{AdjustAvgLeft} = D_{RefAvgLeft} - D_{ObjAvgRight}$, e.g., an average left distance for all of the rows in a block of the reflection minus the average left distance for all of the rows in the corresponding block of the object; and $D_{AdjustAvgRight} = D_{RefAvgRight} - D_{ObjAvgRight}$, e.g., the average right distance for all of the rows in a block of the reflection minus the average right distance for all of the rows in the corresponding block of the object.

Reflection generation subsystem 103 applies reflection parameters to a second object to generate a second reflection. An example of such a process is described with respect to FIG. 9.

FIG. 9 is a flow chart depicting an example of a process 900 for applying reflection parameters to create a new reflection, in accordance with an embodiment of the present disclosure. For illustrative purposes, process 900 is implemented by reflection generation subsystem 103. But any computing device or application, e.g., image processing application 102, can implement process 900.

At block 901, process 900 involves creating a mirror image of the second object. Reflection generation subsystem 103 crates a mirror image of the second object, matching the orientation of an object that is reflected on the reflective surface. Image processing application 102 can determine a line of symmetry by determining the relative position of the image and the reflection. For example, if the image is above the reflection, then the line of symmetry is horizontal and between the image and the reflection. If the image is to the left of the reflection, then the line of symmetry is horizontal and is between the object and the reflection.

At block 902, process 900 involves applying a scaling factor to the mirror image, the scaling factor corresponding to a relative size of the first object and the first reflection. For example, reflection generation subsystem 103 determines the size of the first object in a first dimension (e.g., the width), the size of the first object in a second dimension (e.g., the height), the size of the first reflection in the first dimension, and the size of the first reflection in the second dimension. Reflection generation subsystem 103 determines the size ratio as follows:

$$HD_{1scaling} = \frac{D1_{Reflection}}{D1_{Object}}, \text{ for dimension 1}$$

$$D2_{scaling} = \frac{D2_{Reflection}}{D2_{Object}}, \text{ for dimension 2}.$$

At block 903, process 900 involves dividing the mirror image into a number of blocks that equals a number of blocks in the first image and a number of blocks in the first reflection. Each block includes one or more rows of pixels. The number of blocks in the mirror image equals a number of blocks in the first image and the number of blocks in the first reflection.

At block 904, process 900 involves adjusting, for each block, one or more pixels in the respective block by applying the reflection parameters. The parameters determined at block 705 and/or 706 are used at block 903 to adjust, or scale, the mirror image appropriately. FIG. 9 is discussed with respect to FIG. 10 for illustrative purposes.

Figure 10:
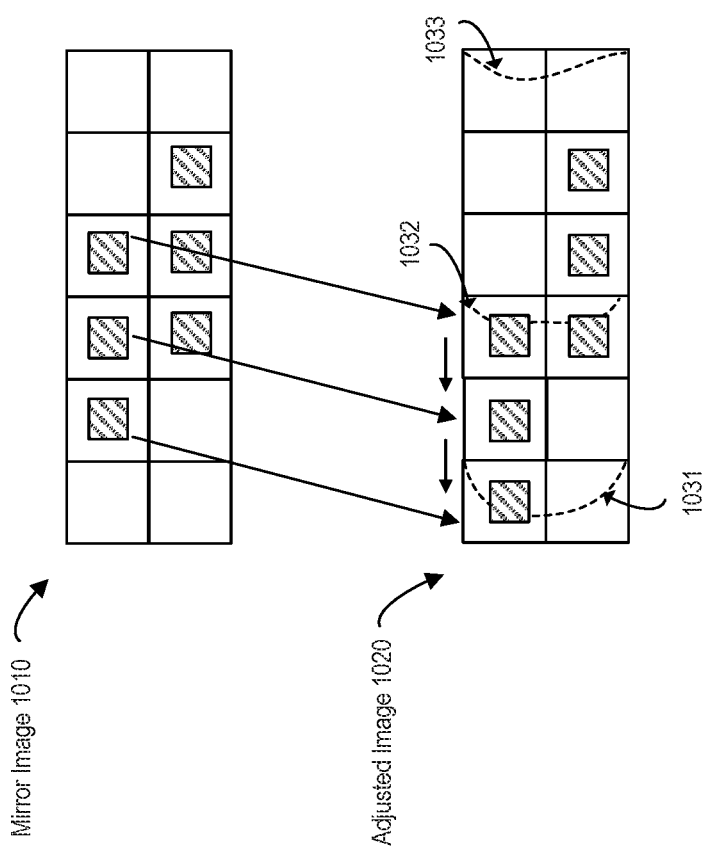
FIG. 10 is a diagram illustrating a mapping of reflection parameters to a new reflection, in accordance with an embodiment of the present disclosure.

FIG. 10 is a diagram illustrating a mapping of reflection parameters to a new reflection, in accordance with an embodiment of the present disclosure. FIG. 10 depicts mirror image 1010 and adjusted image 1020. Mirror image 1010 represents the output of block 903. Mirror image 1010 and adjusted image 1020 are both two rows of six pixels each.

In an example, mirror image 1010 is adjusted by applying adjusting distances 1031 ($D_{AdjustAvgLeft}$), 1032 ($D_{AdjustAvgCenter}$), and 1033 ($D_{AdjustAvgRight}$), which represent the left, center, and right block-average distances (e.g., as computed by process 700) to the image. Adjusted image 1020 represents the output of block 904, that is, mirror image 1010 adjusted to reflect the reflection parameters. As can be seen, the first row of pixels has been shifted to the left As can be seen, relative to the first row of mirror image 1010, the first row of adjusted image 1020 is shifted to the left. But relative to the second row of mirror image 1010, the second row of adjusted image 1020 is not shifted as the leftward shift as indicated by the distances 1031-1033 was not sufficiently large to move the blocks to the left. Given that digital images are represented by pixels, if a given adjusting distance is less than a threshold, then in some cases, adjusting might not take place.

Color Adjustment

Once reflection parameters is applied to the mirror image, the color of each pixel of the adjusted mirror image can be recomputed for realistic visualization by using a blending technique. Color adjustments can be performed separately for red, green, and blue. Blending can be performed as follows:

1. Determine a bounding box of the adjusted mirror image.
2. For each row (from top to bottom):
   a. Initialize two blending parameters as Alpha and Beta. In an example, Alpha=0.9 and beta=0.1.
   b. For each pixel in the row of the adjusted image, determine the RGB components of the adjusted image. $R_W$, $G_W$, and $B_W$ respectively.
   c. For each pixel in the row of the adjusted image, determine the RGB components of the output image. $R_O$, $G_O$, and $B_O$ respectively.
   d. Compute the blended RGB components for the final pixel output for a given row as:
   $R_N = \alpha * R_W + * R_O$ for red;
   $G_N = \alpha * G_W + * G_O$ for green; and
   $B_N = \alpha * B_W + * B_O$ for blue.

Each RGB component can be applied separately to the mirror image, for example, the Alpha can be decreased by a threshold value and Beta increased by a threshold value until color matching is complete. In some cases, completeness can be determined by a user verifying that the color is acceptable. In other cases, suitable values of alpha and beta can be predetermined for image processing application 102. In an example, both the threshold values are set to 0.003. Reflection generation subsystem 103 can adjust the output image to reflect the new RGB components.

Exemplary Computing Systems

Figure 11:
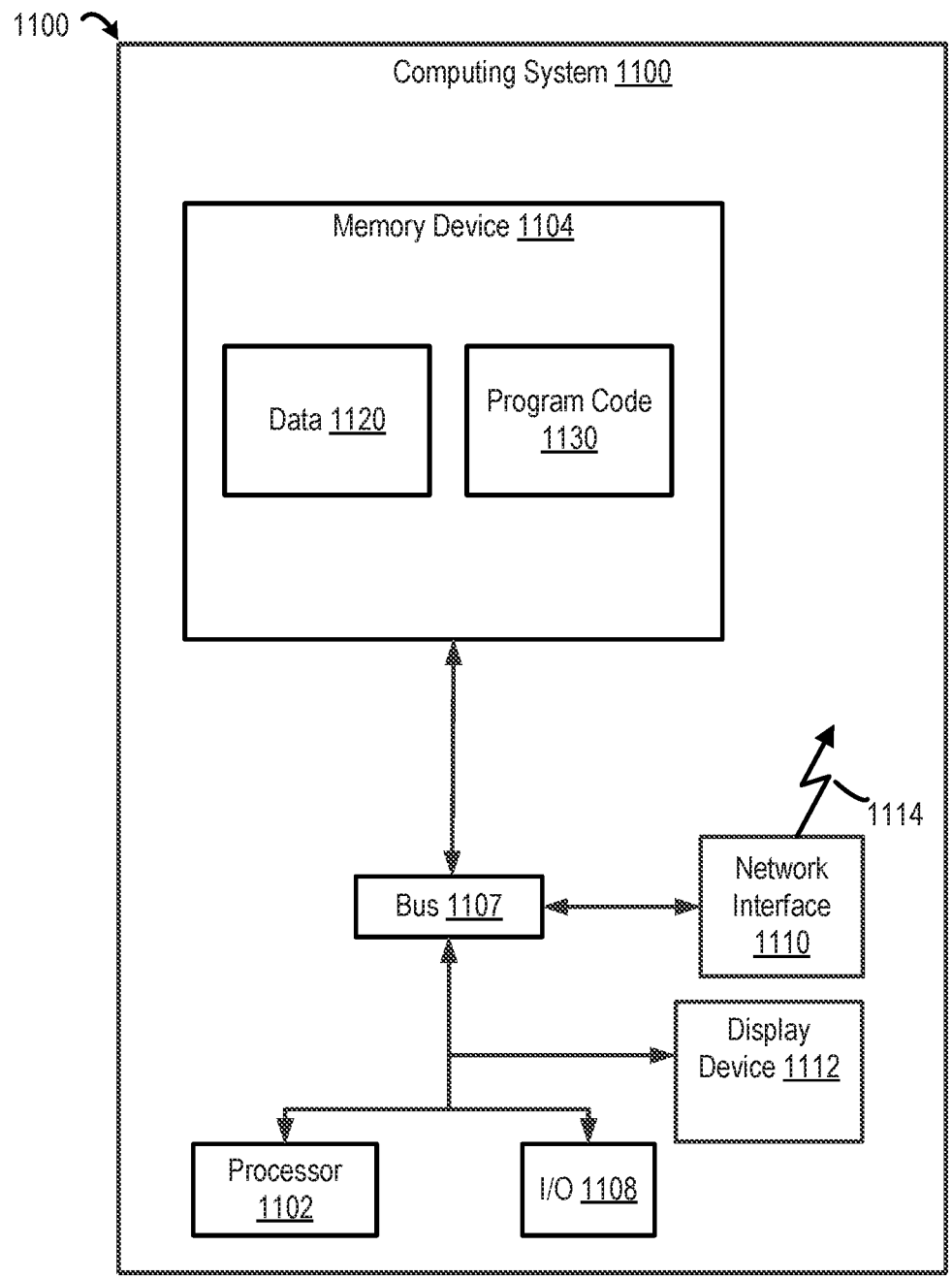
FIG. 11 is a diagram of an example of a computing system, in accordance with an embodiment of the present disclosure.

FIG. 11 is a diagram depicting an exemplary computing system for implementing a document processing application, according to an embodiment of the present disclosure. FIG. 11 depicts computing device 1100, which is an example of computing system 101 and can execute image processing application 102 and/or reflection generation subsystem 103. Any suitable computing system may be used for performing the operations described herein. The depicted example of a computing device 1100, includes a processor 1102 communicatively coupled to one or more memory devices 1104. The processor 1102 executes computer-executable program code 1130 stored in a memory device 1104, accesses data 1120 stored in the memory device 1104, or both. Program code 1130 can be from image processing application 102 and/or reflection generation subsystem 103. Data 1120 can be from image processing application 102 and/or reflection generation subsystem 103.

Examples of the processor 1102 include a microprocessor, an application-specific integrated circuit ("ASIC"), a field-programmable gate array ("FPGA"), or any other suitable processing device. The processor 1102 can include any number of processing devices or cores, including a single processing device. The functionality of the computing device may be implemented in hardware, software, firmware, or a combination thereof.

The memory device 1104 includes any suitable non-transitory, computer-readable medium for storing data, program code, or both. Memory device 1104 can include data, program code, or both, for image processing application 102 and/or reflection generation subsystem 103. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C#, Visual Basic, Java, or scripting language.

The computing device 1100 may also include a number of external or internal devices, such as input or output devices. For example, the computing device 1100 is shown with one or more input/output ("I/O") interfaces 1108. An I/O interface 1108 can receive input from input devices or provide output to output devices. One or more busses 1107 are also included in the computing device 1100. The bus 1107 communicatively couples one or more components of a respective one of the computing device 1100.

The computing device 1100 executes program code 1130 that configures the processor 1102 to perform one or more of the operations described herein. For example, the program code 1130 causes the processor to perform the operations described in FIG. 2 or 3.

The computing device 1100 also includes a network interface device 1110. The network interface device 1110 includes any device or group of devices suitable for establishing a wired or wireless data connection to one or more data networks. The network interface device 1110 may be a wireless device and have an antenna 1114. The computing device 1100 can communicate with one or more other computing devices implementing the computing device or other functionality via a data network using the network interface device 1110.

The computing device 1100 can also include a display device 1112. Display device 1112 can be a LCD, LED, touch-screen or other device operable to display information about the computing device 1100. For example, information could include an operational status of the computing device, network status, etc.

Figure 12:
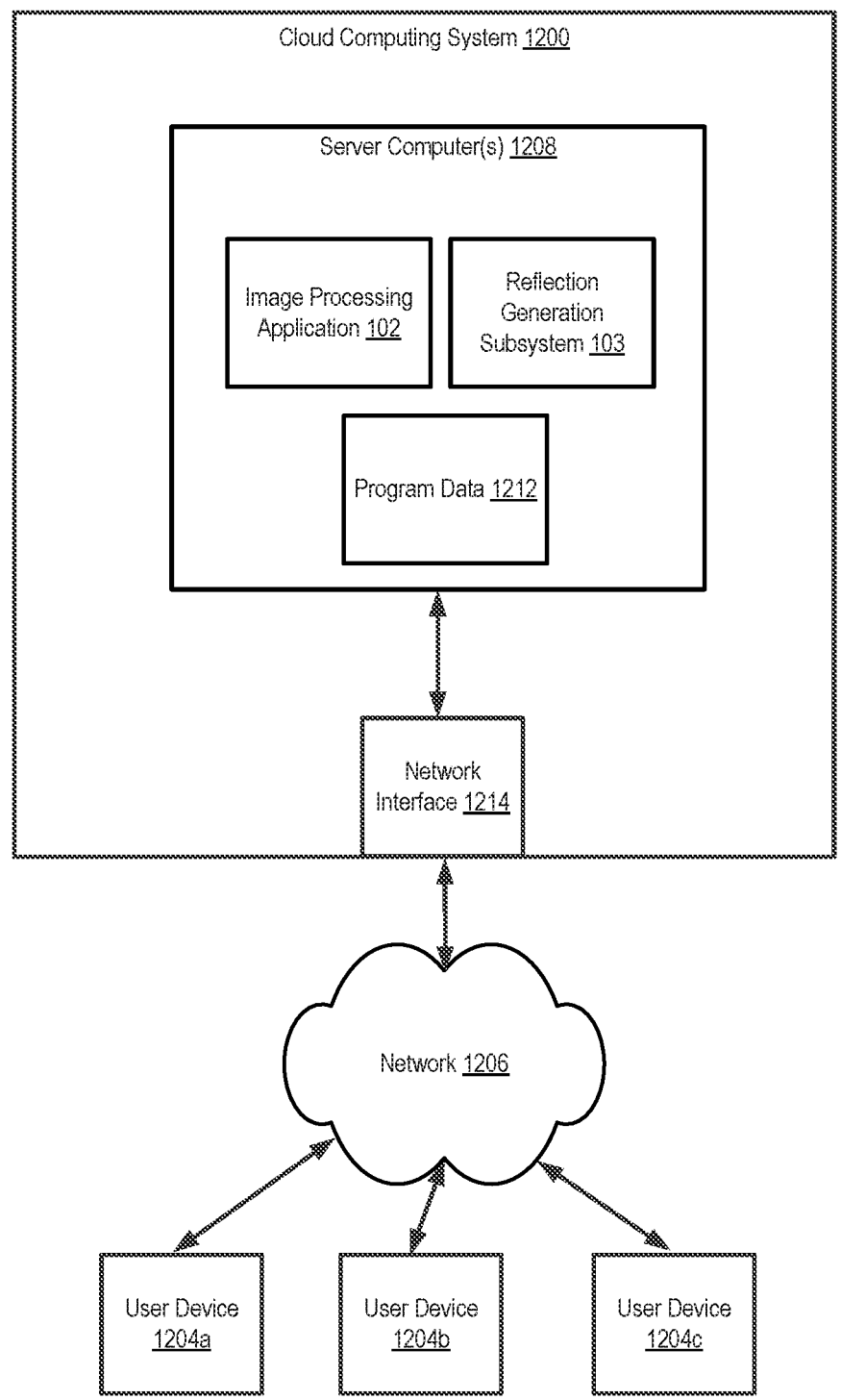
FIG. 12 depicts an example of a cloud computing system offering a reflection generation system, according to an embodiment of the present disclosure.

In some embodiments, the functionality provided by the document editor may be offered as cloud services by a cloud service provider, for example as depicted by FIG. 12.

FIG. 12 depicts an example of a cloud computing system offering a reflection generation system, according to an embodiment of the present disclosure. Cloud computing system 1200 can be used by a number of user subscribers using user devices 1204a, 1204b, and 1204c across a data network 1206. In the example, the document editing service may be offered under a Software as a Service (SaaS) model. One or more users may subscribe to the document editing service, and the cloud computing system 1200 performs the processing to provide the document editing service to subscribers. The cloud computing system 1200 may include one or more remote server computers 1208.

The remote server computers 1208 include any suitable non-transitory, computer-readable medium for storing program code 1210 (e.g., the image processing application 102 or reflection generation subsystem 103) and program data 1212 (e.g., from the image processing application 102 or from the reflection generation subsystem 103), or both, which is used by the cloud computing system 1200 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the remote server computers 1208 can include volatile memory, non-volatile memory, or a combination thereof.

One or more of the remote server computers 1208 execute the program code 1210 that configures one or more processors of the remote server computers 1208 to perform one or more of the operations that provide document editing services, including the ability to generate documents with resized text based upon layout changes of one or more original documents provided by one or more subscribers. As depicted in the embodiment in FIG. 12, the one or more servers providing the services to generate documents with resized text may implement a font resizing subsystem 120. Any other suitable systems or subsystems that perform one or more operations described herein (e.g., one or more development systems for configuring an interactive user interface) can also be implemented by the cloud computing system 1200.

In certain embodiments, the cloud computing system 1200 may implement the services by executing program code and/or using program data 1212, which may be resident in a memory device of the remote server computers 1208 or any suitable computer-readable medium and may be executed by the processors of the remote server computers 1208 or any other suitable processor.

In some embodiments, the program data 1212 includes one or more datasets and models described herein. Examples of these datasets include document arrangement data, text size data, layout change data, etc. In some embodiments, one or more of data sets, models, and functions are stored in the same memory device. In additional or alternative embodiments, one or more of the programs, data sets, models, and functions described herein are stored in different memory devices accessible via the data network 1206.

The cloud computing system 1200 also includes a network interface device 1214 that enables communications to and from cloud computing system 1200. In certain embodiments, the network interface device 1214 includes any device or group of devices suitable for establishing a wired or wireless data connection to the data networks 1206. Non-limiting examples of the network interface device 1214 include an Ethernet network adapter, a modem, and/or the like. The document editor 1202 is able to communicate with the user devices 1204a, 1204b, and 1204c via the data network 1206 using the network interface device 1214.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification, discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method comprising:
accessing, by a processor, an input image comprising a first object, a first reflection of the first object on a reflective surface in the input image, and a second object;
computing, by the processor, a reflection parameter based on analyzing a shape of the first object and a shape of the first reflection, wherein the analyzing comprises:
identifying a row of pixels in the input image, the row of pixels including pixels within a boundary of the first object;
identifying a corresponding row of pixels in the input image, the corresponding row of pixels including pixels within a boundary of the first reflection; and
based on pixels in the row of pixels and the corresponding row of pixels, computing the reflection parameter;
generating, by the processor and using the reflection parameter, a second reflection of the second object on the reflective surface, wherein the generating comprises applying the reflection parameter to the second object;
adding, by the processor, the second reflection to the input image; and
outputting, by the processor, a modified image comprising the first object, the first reflection, the second object, and the second reflection.

2. The method of claim 1, further comprising:
applying a noise-reduction filter to the input image; and
identifying, from the input image, the first object and the first reflection by performing a segmentation on the input image.

3. The method of claim 1, further comprising:
receiving a signal to generate the second reflection; and
determining that the first object and the first reflection are to be used as references for generating the second reflection for the second object.

4. The method of claim 1, wherein the analyzing further comprises computing the reflection parameter based upon a color of the first object and a color of the first reflection.

5. The method of claim 1, wherein computing the reflection parameter further comprises:
creating a bounding box comprising the first object and the first reflection and a plurality of rows including at least the row of pixels and the corresponding row of pixels, each of the plurality of rows comprising a plurality of pixels, wherein the bounding box comprises a center line;
identifying, from the pixels for each row, one or more of: (i) a left boundary pixel, (ii) a right boundary pixel, or (iii) a center axis pixel;
dividing the first object and the first reflection into a number of corresponding blocks, wherein each block comprises one or more rows;
computing, for each row in the first object and for each row in the first reflection, one or more of: (i) a center distance between the center axis pixel of the respective row and the center line, (ii) a left distance between the left boundary pixel of the respective row and the center line, and (iii) a right distance between the right boundary pixel of the respective row and the center line;
determining, for each block in the first object and for a corresponding block in the first reflection, over all rows in a block, one or more of: (i) an average center distance, (ii) an average left distance, and (iii) an average right distance; and
determining, for each block in the first object and the corresponding block in the first reflection, block parameters comprising one or more of (i) a difference between the average center distance for the first object and the first reflection, (ii) the average left distance for the first object and the first reflection, and (iii) the average right distance for the first object and the first reflection; and
determining the reflection parameter based on the block parameters.

6. The method of claim 5, wherein applying the reflection parameter to the second object comprises:
creating a mirror image of the second object;
applying a scaling factor to the mirror image, the scaling factor corresponding to a relative size of the first object and the first reflection;
dividing the mirror image into a number of blocks, wherein each block comprises one or more rows of pixels; and
adjusting, for each block, one or more pixels in the respective block by applying one or more of: (i) the average center distance, (ii) the average left distance, and (iii) the average right distance to the pixels in the respective block.

7. The method of claim 4, wherein applying the reflection parameter to the second object comprises:
determining a first set of color parameters comprising, for each pixel in the first reflection, a red, blue, and green component;
determining a second set of color parameters comprising, for each pixel in the second reflection, a red, blue, and green component;
calculating, for each pixel in the second reflection, a new pixel value comprising a weighted sum of a corresponding first parameter and a corresponding second parameter; and
adjusting the second reflection with the new pixel values, thereby creating the modified image.

8. A system comprising:
a processor; and
a memory comprising computer-readable instructions that, when executed by the processor, cause the system to perform operations comprising:
accessing an input image comprising a first object, a first reflection of the first object on a reflective surface in the input image, and a second object;
computing, by the processor, a reflection parameter based on analyzing a shape of the first object and a shape of the first reflection, wherein the analyzing comprises:
identifying a row of pixels in the input image, the row of pixels including pixels within a boundary of the first object;
identifying a corresponding row of pixels in the input image, the corresponding row of pixels including pixels within a boundary of the first reflection; and
based on pixels in the row of pixels and the corresponding row of pixels, computing the reflection parameter;

generating, from the reflection parameter, a second reflection of the second object on the reflective surface wherein the generating comprises applying the reflection parameter to the second object;

adding the second reflection to the input image; and outputting a modified image comprising the first object, the first reflection, the second object, and the second reflection.

9. The system of claim 8, wherein the operations further comprise:

applying a noise-reduction filter to the input image; and identifying, from the input image, the first object and the first reflection by performing a segmentation on the input image.

10. The system of claim 8, wherein the operations further comprise:

receiving a signal to generate the second reflection; and determining that the first object and the first reflection are to be used as references for generating the second reflection for the second object.

11. The system of claim 8, wherein the analyzing further comprises computing the reflection parameter based upon a color of the first object and a color of the first reflection.

12. The system of claim 8, wherein computing the reflection parameter further comprises:

creating a bounding box comprising the first object and the first reflection and a plurality of rows including at least the row of pixels and the corresponding row of pixels, each of the plurality of rows comprising a plurality of pixels, wherein the bounding box comprises a center line;

identifying, from the pixels for each row, one or more of: (i) a left boundary pixel, (ii) a right boundary pixel, or (iii) a center axis pixel;

dividing the first object and the first reflection into a number of corresponding blocks, wherein each block comprises one or more rows;

computing, for each row in the first object and for each row in the first reflection, one or more of: (i) a center distance between the center axis pixel of the respective row and the center line, (ii) a left distance between the left boundary pixel of the respective row and the center line, and (iii) a right distance between the right boundary pixel of the respective row and the center line;

determining, for each block in the first object and for a corresponding block in the first reflection, over all rows in a block, one or more of: (i) an average center distance, (ii) an average left distance, and (iii) an average right distance; and determining, for each block in the first object and the corresponding block in the first reflection, block parameters comprising one or more of (i) a difference between the average center distance for the first object and the first reflection, (ii) the average left distance for the first object and the first reflection, and (iii) the average right distance for the first object and the first reflection; and determining the reflection parameter based on the block parameters.

13. The system of claim 12, wherein applying the reflection parameter to the second object comprises:

creating a mirror image of the second object;

applying a scaling factor to the mirror image, the scaling factor corresponding to a relative size of the first object and the first reflection;

dividing the mirror image into a number of blocks, wherein each block comprises one or more rows of pixels; and adjusting, for each block, one or more pixels in the respective block by applying one or more of: (i) the average center distance, (ii) the average left distance, and (iii) the average right distance to the pixels in the respective block.

14. The system of claim 11, wherein applying the reflection parameter to the second object comprises:

determining a first set of color parameters comprising, for each pixel in the first reflection, a red, blue, and green component;

determining a second set of color parameters comprising, for each pixel in the second reflection, a red, blue, and green component;

calculating, for each pixel in the second reflection, a new pixel value comprising a weighted sum of a corresponding first parameter and a corresponding second parameter; and adjusting the second reflection with the new pixel values, thereby creating the modified image.

15. A non-transitory computer-readable medium having stored thereon instructions that, when executed by one or more processors of a computing device, cause the one or more processors to perform operations including:

accessing an input image comprising a first object, a first reflection of the first object on a reflective surface in the input image, and a second object;

computing, by the processor, a reflection parameter based on analyzing a shape of the first object and a shape of the first reflection, wherein the analyzing comprises:

identifying a row of pixels in the input image, the row of pixels including pixels within a boundary of the first object;

identifying a corresponding row of pixels in the input image, the corresponding row of pixels including pixels within a boundary of the first reflection; and based on pixels in the row of pixels and the corresponding row of pixels, computing the reflection parameter;

generating, using the reflection parameter, a second reflection of the second object on the reflective surface wherein the generating comprises applying the reflection parameter to the second object;

adding the second reflection to the input image; and outputting a modified image comprising the first object, the first reflection, the second object, and the second reflection.

16. The non-transitory computer-readable medium of claim 15, wherein the operations further comprise:

applying a noise-reduction filter to the input image; and identifying, from the input image, the first object and the first reflection by performing a segmentation on the input image.

17. The non-transitory computer-readable medium of claim 15, wherein the operations further comprise:

receiving a signal to generate the second reflection; and determining that the first object and the first reflection are to be used as references for generating the second reflection for the second object.

18. The non-transitory computer-readable medium of claim 15, wherein the analyzing further comprises computing the reflection parameter based upon a color of the first object and a color of the first reflection.

19. The non-transitory computer-readable medium of claim 18, wherein computing the reflection parameter comprises:
creating a bounding box comprising the first object and the first reflection and a plurality of rows including at least the row of pixels and the corresponding row of pixels, each of the plurality of rows comprising a plurality of pixels, wherein the bounding box comprises a center line;
identifying, from the pixels for each row of the plurality of rows, one or more of: (i) a left boundary pixel, (ii) a right boundary pixel, or (iii) a center axis pixel;
dividing the first object and the first reflection into a number of corresponding blocks, wherein each block comprises one or more rows;
computing, for each row in the first object and for each row in the first reflection, one or more of: (i) a center distance between the center axis pixel of the respective row and the center line, (ii) a left distance between the left boundary pixel of the respective row and the center line, and (iii) a right distance between the right boundary pixel of the respective row and the center line;
determining, for each block in the first object and for a corresponding block in the first reflection, over all rows in a block, one or more of: (i) an average center distance, (ii) an average left distance, and (iii) an average right distance;
determining, for each block in the first object and the corresponding block in the first reflection, block parameters comprising one or more of (i) a difference between the average center distance for the first object and the first reflection, (ii) the average left distance for the first object and the first reflection, and (iii) the average right distance for the first object and the first reflection; and
determining the reflection parameter based on the block parameters.

20. The non-transitory computer-readable medium of claim 19, wherein applying the reflection parameter to the second object comprises:
creating a mirror image of the second object;
applying a scaling factor to the mirror image, the scaling factor corresponding to a relative size of the first object and the first reflection;
dividing the mirror image into a number of blocks, wherein each block comprises one or more rows of pixels; and
adjusting, for each block, one or more pixels in the respective block by applying one or more of: (i) the average center distance, (ii) the average left distance, and (iii) the average right distance to the pixels in the respective block.

* * * * *